Patented Sept. 15, 1931

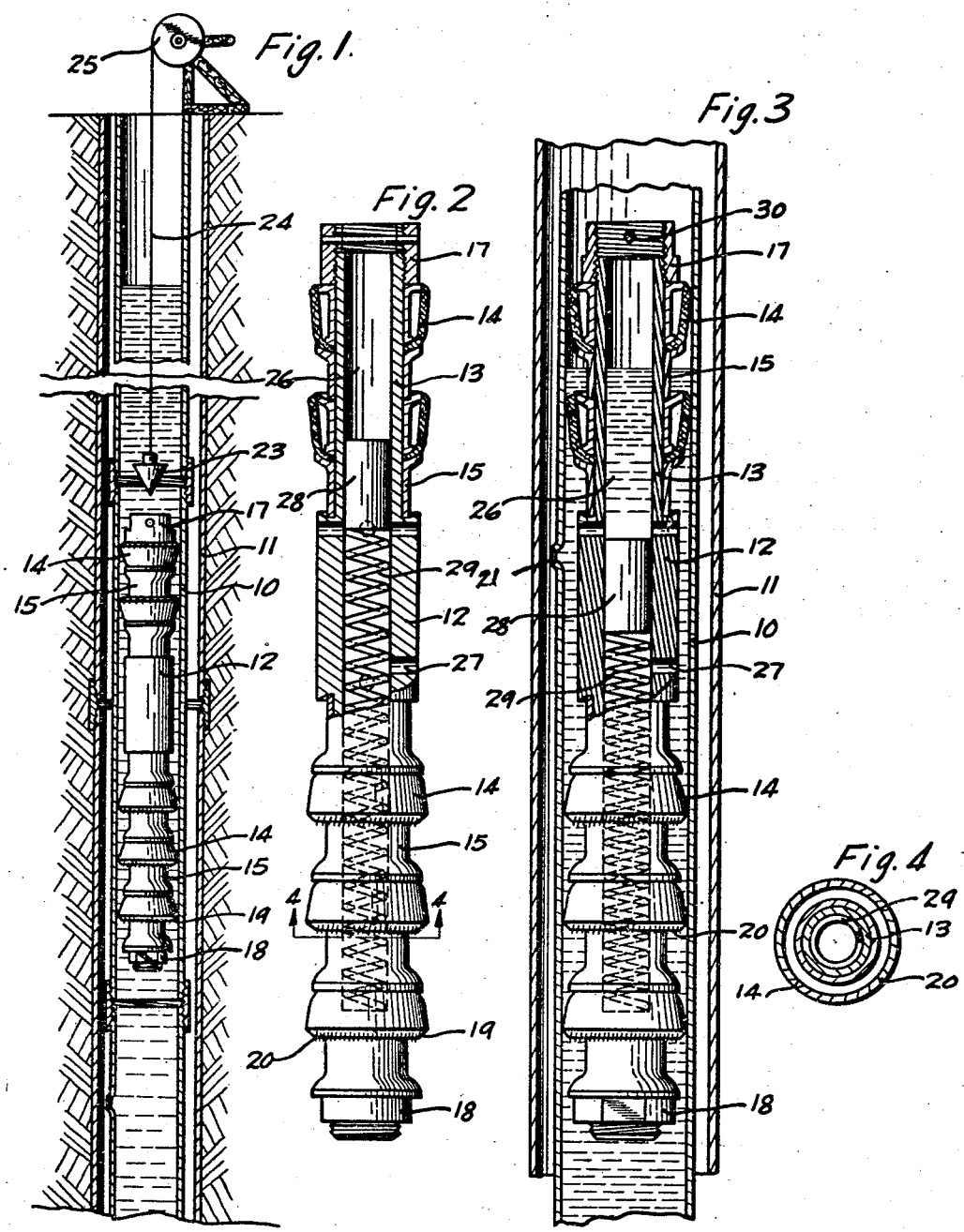

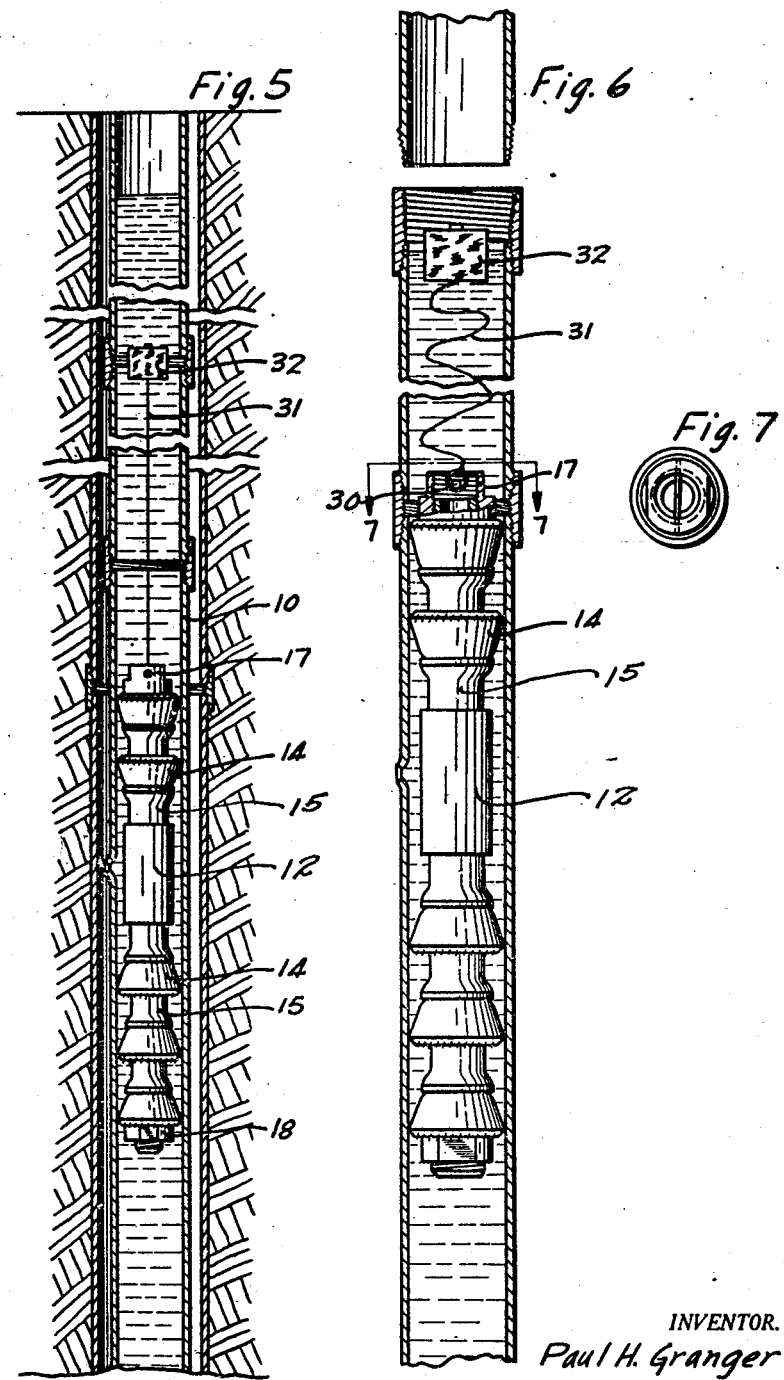

1,822,925

UNITED STATES PATENT OFFICE

PAUL H. GRANGER, OF LOS ANGELES, CALIFORNIA

APPARATUS FOR LOCATING LEAKS

Application filed March 14, 1928. Serial No. 261,467.

This invention relates to apparatus for locating leaks in well piping and the like while in the well hole and under normal conditions of pressure, in order that the location of the leak may be determined with minimum loss of time and expenditure of labor and money.

It is an object of the invention to provide an indicator adapted to be lowered in a well pipe or tubing until arrested by an incompressible column of fluid standing in the pipe to the level of a leak which is known to exist, so that measuring the distance to which the indicator has descended to its arrested position will accurately locate the leak.

Another object of the invention is to provide the indicator with a normally closed valvular means adapted to be automatically opened when the indicator is arrested at the level of the leak in the well piping, thereby permitting escape of a column of liquid in the tubing above the indicator, and thus permitting subsequent withdrawal of the pipe in a dry condition. The pulling of tubing containing water or other liquid which is known as a "wet string" requires the expenditure of a comparatively great force. Furthermore, on some tubing jobs the equipment for pulling a wet string is lacking. The present invention obviates the necessity of a wet job.

A further object of the invention is to provide suitable packing for the indicator adapted to readily yield and thus pass any obstructions in the string of tubing until the indicator is arrested by the column of fluid standing in the tubing, with the packing adapted for expansion when the column of liquid above the indicator forces it downwardly against the incompressible column of fluid standing to the level of the leak, thereby insuring the indicator being arrested at the leak in the pipe so that the leak may be accurately located.

A still further object of the invention is to provide a pilot for indicating the approximate location of the indicator when the string of piping is being taken down.

A still more specific object is to provide a cup having a wear resisting edge to guard the cup against being torn and damaged in its travel.

These objects together with further objects which will hereinafter appear, may be obtained by the embodiments of the invention illustrated in the accompanying drawings, in which:—

Fig. 1 is a vertical section through a well showing the leak indicator in elevation and descending to operative position; Fig. 2 is a side elevation of the leak indicator, partly in axial section; Fig. 3 is a vertical section through a fragment of the well, showing the leak indicator partly in axial section and in the position which it assumes at the level of a leak; Fig. 4 is a transverse section on the line 4—4 of Fig. 2; Fig. 5 is a vertical section through a well showing the leak indicator with a pilot appended in a tubing within a well hole; Fig. 6 is a vertical section through the tubing removed from the well and with a section unjointed to indicate the action of the pilot; and Fig. 7 is a plan view of the indicator.

Referring more particularly to Figs. 1 to 4, the leak indicator may be employed for locating leaks in tubing, casing, or any other well piping, and in the drawings is illustrated as employed in usual well tubing 10 which is received in the well casing shown at 11. When a leak occurs in the tubing, as evidenced for example by the pumping action, the usual sucker rod is first withdrawn, and the lower end of tubing 10 maintained closed, preferably by leaving the usual standing valve in position, and a plug or closure means which forms the leak indicator is then lowered in the tubing.

The indicator is shown as a mandrel 12 having ends 13 reduced in diameter and provided with external packing means adapted to slide in tubing 10, the packing being arranged for expansion to form a fluid tight engagement with the tubing when the indicator reaches the level of a leak in the tubing. The packing may comprise a series of rings or cups 14 adjacent each end of body 12. Each of the rings or cups may be of leather or other suitable flexible material pressed into cup or bowl shape, with the series of cups at each end of the body preferably spaced apart by cup rings 15 and having their central portions clamped between shoulders on the body and follower nuts 17 and 18 which are threaded onto the end of the mandrel.

The packing cups are preferably flared so as to normally approximately engage the wall of tubing 10 at their greatest diameter, and beyond said greatest diameter the free edges of the cups may taper as shown at 19 so as to form contracted lips insuring the cups moving through the tubing without catching in the joints or being held by other obstructions such as may result from irregularities in the pipe. The cups are guarded at their ends by a wear resisting covering. In this case, their free edges are provided with a suitable wire or the like as shown at 20 laced and serving as a means for protecting the lips of the cups against excessive wear and guiding the cups past any obstruction in the bore of the tubing. Although I have shown a particular guard of wire lacing, other expedients may be resorted to for accomplishing this purpose.

The packing cups at the upper end of mandrel 12 flare upwardly and outwardly while the outward flare of the packing cups at the lower end of the mandrel is in a downward direction, and as a consequence the upper packing means is expanded to form a fluid tight engagement by pressure from above, while the lower packing means is similarly expanded by pressure from below.

The leak indicator is thus adapted to readily descend by gravity through the upper end of tubing 10 since the packing 14 when in its normal position slides freely through the bore of the tubing, but when the indicator in its descent reaches a column of fluid standing in the tubing it is retarded or arrested. Such a column of fluid is maintained in the tubing by filling the tubing with a suitable fluid such as oil or water to a point above that at which it starts to escape through the leak which it is desired to locate and which is marked 21, and when the indicator is retarded or arrested by this column of fluid, the hydrostatic pressure of a column of liquid such as water is exerted downwardly upon the indicator by introducing such a column of liquid into the tubing above the indicator.

The pressure of the fluid below the indicator thus expands the lower packing cups while the upper packing cups are similarly expanded by the hydrostatic pressure above the indicator, and the indicator thus forms a fluid tight engagement in the bore of the tubing. The hydrostatic pressure above the indicator causes its gradual further descent so long as the fluid below the indicator continues to pass out the leak, but when the lower packing of the indicator encounters the incompressible column of fluid 22 extending upwardly to the level of the leak, further downward movement of the indicator is completely arrested and it is thus accurately positioned at the level of the leak.

The distance to which the indicator has descended may then be ascertained in any suitable manner for definitely determining the location of the leak, and for this purpose a plumb bob 23 may be lowered in the tubing 10 until it rests upon the indicator which has been arrested at the level of the leak. The plumb bob may be carried by a suitable line 24 which may be operated by a reel 25, with the parts suitably arranged for measuring the length of line which is paid out. The measuring operation may proceed concurrently with the gradual lowering of the indicator to the point of its final arrest at the level of the leak, and the moment at which the plumb bob is stopped in its descent by striking the arrested indicator may be readily determined by the decrease in the pull upon the measuring line.

With the location of the leak thus accurately determined, the string of tubing may be pulled for repair, but disconnecting the lengths of the string of tubing as it is withdrawn will result in discharge at the derrick floor of the column of liquid which has been introduced into the tubing above the indicator unless steps are first taken for permitting escape of this liquid.

The indicator is therefore preferably so constructed as to discharge this column of liquid into the well bore as soon as the plug is arrested at the level of the leak. For this purpose the mandrel 12 may be provided with a bore 26 opening through its upper end and terminating short of its lower end, and a port 27 opens laterally from this bore through the wall of the mandrel between the upper and lower packing means. A valve plug 28 is slidable in the bore 26 and is normally projected upwardly by a spring 29 so as to close the upper end of bore 26 to the port 27, and the valve plug may be held against displacement from the bore 26 by a transverse retaining pin 30 which preferably extends through the upper follower nut 18.

Until the time that the leak indicator is arrested in its descent by the imcompressible column of fluid standing in the tubing to the level of the leak, the spring 29 retains plug 28 in its normal position as shown in Fig. 2, so that the port 27 is closed against discharge of the column of liquid which is introduced into the tubing above the indicator, but when the indicator is arrested in its leak locating position with its lower packing just below the level of the leak, the hydrostatic pressure of the column of liquid above the indicator causes spring 29 to yield and forces valve plug 28 downwardly until port 27 is opened to the upper end of bore 26 as shown in Fig. 3. The column of liquid above the leak indicator is thus free to escape through the open port 27 and thence through the leak 22 into the surrounding well casing, and as a consequence that portion of the string of tubing above the leak which must be withdrawn for the necessary repairs, is relieved of liquid so that the string will be dry when its lengths are disconnected, except preferably a short column of liquid above the indicator. This may be determined by the spring pressure.

I have thus provided extremely simple but practical means for accurately locating a leak in any type of tubing or piping while it is in position extending into a well bore, and with the leak thus located the piping may be rapidly withdrawn for the necessary repairs without retarding the work through the necessity of carefully inspecting the piping, until the ascertained location of the leak has been reached; and by locating the leak while the piping is still in the well the leak is detected under the normal pressure conditions which exist when the well is operating, thereby insuring detection of a leak which might escape observation if the piping were inspected after its withdrawal when the normal working pressure had been relieved, as in the case of a split.

The improved apparatus also insures the indicator descending to exactly the level of a leak so that its position may be accurately determined, since by tightly packing-off the indicator the incompressible column of fluid standing in the piping to the level of the leak prevents its descent below such point, while the column of liquid above the indicator insures it descending all the way to the level of the leak; and by providing for automatic discharge of the column of liquid above the indicator when it has been arrested at the level of the leak, I provide for subsequent pulling of a substantially dry string so that the taking down of the string may be proceeded with without the inconveniences caused by escaping liquid when the lengths of piping are disconnected. A wet string is of great weight and requires strong equipment as well as great force to pull the same.

In some instances it may be desirable to locate the leak after lodgment of the indicator in leak locating position by pulling the string and unjointing the stands of pipe or tubing until the indicator is reached. There are instances in which the leak is open under the pressure of the head of liquid in the tubing but will close upon release of such pressure. In such a case, it is difficult to determine the leak by an inspection of the pipe, even though its approximate location is known. It is the common practice to take down the tubing in stands of three or four joints of pipe as the latter is pulled. If the indicator is in a stand of pipe, and the string is unjointed below the indicator the latter may be displaced by gravity and the pressure above. The result is that an inspection of the stand must be made to determine the exact location of the leak. To avoid the possibility of unjointing the string below the indicator and before its position is determined, I have provided a pilot.

Referring to Figs. 5, 6 and 7, the same type of indicator as before described is shown. Appended to the pin 30 is a flexible line 31 and at the end thereof is a float 32. The line should be at least the length of a stand of pipe. The valve spring is adjusted so that the valve will maintain a column of water above the indicator. This will insure the float being positioned above the indicator. The position of the float as the indicator descends is shown in Fig. 5. When the last joint before the stand having the indicator therein is unjointed, the pilot float will show on the surface of the liquid as shown in Fig. 6. This warns the operator that the indicator is in the stand, whereupon its position may be accurately determined by any well known means.

What I claim is:—

1. Means for locating leaks in well tubing comprising a movable closure plug adapted to be inserted within the tubing and provided at its ends with packing means adapted to make a liquid tight contact with the walls of the well tubing, the said closure plug having a lateral discharge port between said end packing, said plug having a passage placing said port in communication with the space beyond one end of said plug and a normally closed valve for said port adapted to open responsive to fluid pressure in back of the closure plug for permitting discharge of the fluid through the port.

2. Means for locating a leak in piping, comprising a closure plug adapted for movement through one end of the piping until arrested in alinement with the leak by an incompressible column of fluid filling the piping between its opposite end and the said leak, and pilot means comprising a float attached to the arrested closure plug for determining its approximate location.

3. Means for locating leaks in well tubing comprising a movable closure means having longitudinally spaced packing for fluid tight engagement with the wall of the tubing, said closure means being adapted to be inserted within the tubing and having a lateral discharge port intermediate said packing and being further provided with a normally closed valve and an inlet passage opening to the space beyond one end of said closure means, the said valve being adapted to open responsive to fluid pressure in back of the closure means for permitting discharge of the fluid through the port, and a pilot secured to said closure means for indicating its approximate location.

4. Means for locating leaks in well tubing comprising a free falling closure means adapted to be inserted within the tubing and provided at its ends with packing means adapted to make a liquid tight contact with the walls of the well tubing, the said closure means having a passage opening beyond one end of said closure means and a lateral discharge port between said ends, a normally closed valve for said port adapted to open responsive to fluid pressure in back of the closure means for discharging the fluid through the port, a buoyant pilot and flexible means securing said pilot to said closure means for indicating its approximate location.

5. Means for locating leaks in well tubing comprising a free falling closure means adapted to be inserted within the tubing and provided with packing means at its ends adapted to make liquid tight contact therewith under the pressure of liquid in the tubing, a pilot float, and a flexible line securing said float to said plug.

In witness that I claim the foregoing I have hereunto subscribed my name this 8th day of March, 1928.

PAUL H. GRANGER.